March 1, 1938.  R. P. HEUER  2,110,067
IRON DESULPHURIZATION
Filed Aug. 19, 1936  5 Sheets—Sheet 1

Patented Mar. 1, 1938

2,110,067

UNITED STATES PATENT OFFICE 2,110,067

IRON DESULPHURIZATION

Russell P. Heuer, Bryn Mawr, Pa.

Application August 19, 1936, Serial No. 96,743

23 Claims. (Cl. 75—49)

The invention relates to the manufacture of pig iron and the production of steel, and particularly to the desulphurization of pig iron.

A purpose of the invention is to operate a coke blast furnace to produce pig iron higher in sulphur than that ultimately desired, and preferably at a lower cost than normal, by operating the blast furnace at a lower temperature and/or with less basic slag and/or with low grade raw materials causing higher sulphur in the charge, and to treat the molten pig iron thus produced with a basic slag external to the blast furnace hearth, subjecting the slag and molten pig iron together to a pressure less than normal atmospheric pressure to remove the excess sulphur from the molten pig iron. The pig iron thus produced may be used in the form of cast iron or as raw material for making steel.

A further purpose is to agitate molten pig iron during desulphurizing treatment with a basic slag under reducing conditions and with the exclusion of oxidizing substances while subjecting the pig iron and slag to a pressure less than normal atmospheric pressure.

A further purpose is to desulphurize molten pig iron excessively high in sulphur by treating it in a closed vessel with a basic desulphurizing slag in the presence of an excess of a noncontaminating reducing gas such as carbon monoxide under a pressure less than normal atmospheric pressure.

A further purpose is to build up a higher ratio between the sulphur in the slag and the sulphur in the pig iron than would be obtained with the same slag under atmospheric pressure and under substantially equilibrium conditions.

A further purpose is to desulphurize by a slag which would not be desulphurizing at the same temperature under atmospheric pressure.

A further purpose is to desulphurize an iron bath under vacuum conditions and in the presence of a slag and to subsequently protect against resulphurization of the bath during removal of the slag by filling the space above the bath by a non-contaminating gas at atmospheric pressure.

A further purpose is to prevent resulphurization of a bath of molten iron which has been freed from sulphur under vacuum conditions, by filling the vacuum space with gas free from contamination by oxygen, carbon dioxide, carbon monoxide and water vapor.

A further purpose is to economize upon the use of desulphurizing slag in any of the processes disclosed herein by effecting the desulphurizing treatments in stepwise manner, preferably initially subjecting the pig iron to a first desulphurizing slag which is relatively high in sulphur content and therefore limited in its ability to take up sulphur from the pig iron, and, after removal of the first slag, treating the pig iron with one or more further slags of lower sulphur content and correspondingly greater ability to remove sulphur. In this way, pig iron containing substantially more than 0.10% of sulphur, say 0.3% of sulphur or more, can have its sulphur content reduced to less than 0.05% sulphur, that is, to less than half, by treatment for an hour or more with slags which aggregate less than 8%, for example, only about 5%, of the weight of the pig iron.

A further purpose is to desulphurize molten pig iron with a slag capable of absorbing sulphur up to a percentage at least one hundred times the percentage present in the desulphurized iron, to maintain the slag and molten pig iron under a pressure less than normal atmospheric pressure, to separate the slag from the desulphurizing vessel and from the molten pig iron and to revivify the slag while it is out of contact with the molten pig iron to permit the reuse of the slag for desulphurizing more iron.

A further purpose is to withdraw molten pig iron and molten blast furnace slag from the blast furnace and to desulphurize the molten pig iron by the molten blast furnace slag under reducing conditions in a vessel maintained at a pressure below normal atmospheric pressure by a vacuum pump or the like.

A further purpose is to desulphurize molten pig iron in a stepwise manner in a closed vessel under a pressure less than normal atmospheric pressure by initially treating it with a first slag relatively high in sulphur which has been used to desulphurize a previous charge of pig iron and not since revivified and by subsequently treating it with a second slag which is relatively low in sulphur, revivifying each slag out of contact with the pig iron when its sulphur content becomes high enough to prevent efficient desulphurization. In normal operation, the first slag after use is immediately revivified and the second slag after use is preserved for treatment of the next pig iron charge before revivification.

A further purpose is to desulphurize molten pig iron by a slag in such manner as to protect the slag from the influence of free oxygen, predominantly oxidizing oxides of carbon and water during the desulphurizing step whilst maintaining the molten pig iron and slag under a pressure less than normal atmospheric pressure, to subsequently treat the sulphur-bearing slag in the presence of carbon dioxide and water to remove its sulphur content and to use the treated slag to desulphurize additional pig iron.

A further purpose is to desulphurize molten pig iron by a slag in an enclosed vessel provided with means to maintain the pig iron and slag under a pressure less than normal atmospheric pressure and desirably provided with means for agitating the molten contents of the vessel.

A further purpose is to use the pig iron desulphurized in the novel manner disclosed herein for the manufacture of steel, preferably as a continuous process in which the iron remains molten from the time it leaves the blast furnace until the time that it leaves the steel-making furnace.

Further purposes appear in the specification and in the claims.

The invention relates not only to the process involved, but also to the slag employed and to the apparatus used and is in part a further development and improvement of the inventions described in my copending United States patent application, Serial No. 20,555, filed May 9, 1935.

The drawings are largely diagrammatic illustrations primarily intended to aid in understanding the invention, or to disclose apparatus which may be employed in performing the process. All apparatus shown is strictly schematic, and no effort has been made to complicate the disclosure by the illustration of detail within the routine skill of those in the art.

Figure 3 is a left end elevation of the structure of Figure 2.

Figure 4 is a transverse section of Figure 2 upon the line 4—4 thereof, with the top opening free for admittance of material and a furnace and runner in place.

Figures 5 and 5a are fragmentary views corresponding to a portion of Figure 4 respectively without and with permissible heating electrodes and showing the opening 36 closed by an airtight cover.

In the drawings like numerals refer to like parts, and in the specification like symbols refer to like subjects matter.

Throughout the specification, wherever reference is made to pig iron, it is intended to designate the product of the blast furnace which characteristically has a high carbon content, usually of 3% to 4%, or more, and always in excess of 2%, with varying contents of metalloids. The product of the blast furnace is referred to as pig iron whether it is intended to be used in the form of cast iron or whether it is to be used in making steel.

In the production of pig iron from low-sulphur burdens (such as wood charcoal and low sulphur ores) it is unnecessary to operate the blast furnace in such a manner as to obtain strong desulphurizing conditions in the hearth and bosh of the blast furnace. As a result the operation of the charcoal blast furnace is quite economical except for the excessive costs of charcoal and of low sulphur ores. In most instances, however, because of the high cost of wood charcoal, it is necessary to substitute coke for wood charcoal as a blast furnace fuel. When this is done, a strong desulphurizing action must be obtained in the hearth and bosh of the blast furnace in order to obtain a product having low enough sulphur to be commercially usable. For a strong desulphurizing action, it is necessary to have a higher temperature and a slag containing more lime. More fuel must be used in order to provide the higher temperature.

A typical slag from a charcoal blast furnace approximates

| | Per cent |
|---|---|
| $SiO_2$ | 47.0 |
| $Al_2O_3$ | 18.0 |
| CaO | 27.0 |
| MgO | 3.0 |
| S | 0.10 |

In the above slag the silica exceeds the lime plus magnesia. The sulphur in the pig iron approximates 0.02%.

A typical slag from a coke blast furnace has the following approximate composition

| | Per cent |
|---|---|
| $SiO_2$ | 34.0 |
| $Al_2O_3$ | 12.0 |
| CaO | 40.0 |
| MgO | 10.0 |
| S | 1.7 |

In the above slag the silica is less than the lime plus magnesia. The sulphur in the pig iron approximates 0.03%.

The temperatures of the slag and pig iron tapped from a charcoal blast furnace are about 1450° C. and 1410° C. respectively. In the coke blast furnace, the respective temperatures of the slag and pig iron as tapped are approximately 1525° C. and 1475° C. Thus it is unnecessary for the charcoal blast furnace to expend as much heat to produce slag and pig iron as does the coke blast furnace.

From the above data it will be obvious that the cost of removing sulphur from the pig iron simultaneously with smelting of the ore in a blast furnace is considerable. It is one purpose of the present invention to cheapen the cost of manufacturing pig iron, whether for use as cast iron or for making steel, by omitting the strong desulphurizing action now considered necessary in the coke blast furnace because of the sulphur-bearing burdens. The iron is smelted in the coke blast furnace under conditions similar to those prevailing in charcoal blast furnaces, desirably using a blast furnace slag in which the silica exceeds the lime plus magnesia. The smelting is conducted in the coke blast furnace under conditions of temperature and basicity of slag characteristic of the charcoal blast furnace and suitable to produce pig iron at lower cost but with a higher sulphur content in the iron than that ultimately desired. The sulphur content in the iron produced may be for example 0.25% sulphur. After production of this high sulphur pig iron, it is treated in novel manner as a wholly independent operation to remove the excess of sulphur. The cost of the desulphurization is small and it is possible to produce pig iron of desirable quality at a considerable saving. Of course it is not necessary that the high sulphur pig iron contain as much as 0.25% sulphur before treatment. The process is equally adapted to the desulphurization of pig iron containing 0.10% sulphur or 0.05% sulphur or less depending upon individual conditions.

The pig iron, containing a higher sulphur content than that ultimately desired, is transferred from the coke blast furnace to a suitable desulphurizing vessel as described later. The pig iron is there subjected to a strongly basic slag under reducing conditions while subjecting the iron and slag to a pressure less than normal atmospheric pressure. It is generally considered that the sulphur in pig iron is present as FeS. This iron sulphide will dissociate thus:

$$FeS \rightarrow Fe + \tfrac{1}{2}S_2 \qquad (1)$$

Figure 1:
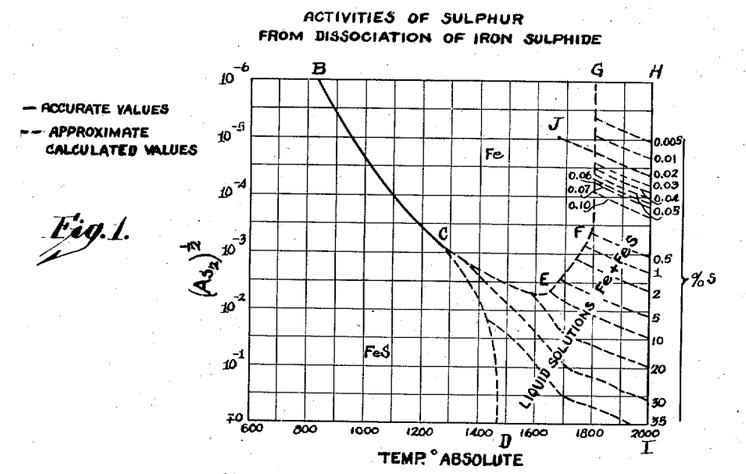
Figure 1 is a diagram whose ordinates are the square roots of activities of sulphur from dissociation of iron sulphide. The abscissae are absolute temperatures.

Due to this dissociation, there is a certain activity of sulphur in the molten pig iron which is measured at constant temperature by the equilibrium constant for Equation (1), thus $$\frac{(A_{Fe}).(A_{S_2})^{\frac{1}{2}}}{(A_{FeS})} = K_1 \qquad (2)$$

where $(A_{Fe})$ = activity of iron $(A_{S_2})$ = activity of sulphur $(A_{FeS})$ = activity of iron sulphide $K_1$ = equilibrium constant The iron sulphide is considered to be present in solution in the molten pig iron and its activity varies as the concentration. The relation of sulphur activity and sulphur concentration is expressed in Figure 1, taken from H. Schenck, Physikalische Chemie der Eisenhüttenprozesse (Verlag von Julius Springer, Berlin, 1932) volume 1, page 263. In this figure, the ordinates are square roots of the activities of sulphur from dissociation of iron sulphide and the abscissae are temperature in degrees absolute (K.). The curves are plotted for an iron-sulphur system free from carbon.

Within the area D C E F G H I, iron sulphide and iron occur as liquid solutions. In these solutions the sulphur activity is a function of sulphur concentration. In Figure 1, diagonal dotted lines are shown corresponding to the sulphur percentages indicated by the numerals to the right of the dotted lines. The sulphur activity resulting from a given sulphur percentage in the melt and a given temperature is shown by these dotted lines. It would require a third dimension to show the relation of sulphur activity, sulphur concentration and temperature for liquids containing iron, iron sulphide and carbon. As an approximation for example to conditions prevailing in molten pig iron of 0.02% sulphur content at 1400° C. (1673° K.) we may extend the line for 0.02% sulphur outside the area D C E F G H I and into the area B C E F G until the temperature 1673° K. is reached and learn that at J the $$(A_{S_2})^{\frac{1}{2}}$$

equals approximately $10^{-5.1}$ for 0.02% sulphur at 1400° C.

From Figure 1 it will be seen that, as the pig iron is subjected to conditions which lower the sulphur activity, the sulphur content will fall.

The desulphurizing slag contains basic oxides of the alkaline earth or alkali metals such as calcium oxide, barium oxide, strontium oxide, sodium oxide, etc. These are referred to generally as $R_xO$ oxides, where R is an alkaline earth or alkali metal and $x$ is the numeral 2 or 1, depending upon the valence of the metal. The oxides of the slag tend to react with sulphur of the pig iron thus:

$$R_xO + \tfrac{1}{2}S_2 = R_xS + \tfrac{1}{2}O_2 \qquad (3)$$

For this reaction the equilibrium at constant temperature is expressed thus:

$$\frac{(A_{R_xS}).(A_{O_2})^{\frac{1}{2}}}{(A_{R_xO}).(A_{S_2})^{\frac{1}{2}}} = K_2 \qquad (4)$$

where $(A_{R_xO})$ = activity of $R_xO$ $(A_{R_xS})$ = activity of $R_xS$ $(A_{O_2})$ = activity of oxygen $K_2$ = equilibrium constant From Reaction (3) it will be evident that there will be a low activity of sulphur and sulphur can be removed from the pig iron to enter the slag most efficiently if there is a low oxygen activity. In other words, the sulphur activity may be lowered directly by lowering the oxygen activity. The desulphurizing slag is therefore caused to act upon the pig iron in the presence of a reducing agent, preferably an excess of carbon. The carbon produces a low oxygen activity according to the reaction:

$$C + \tfrac{1}{2}O_2 \rightarrow CO \qquad (5)$$

The equilibrium expression for this reaction is $$\frac{(A_{CO})}{(A_C).(A_{O_2})^{\frac{1}{2}}} = K_3 \qquad (6)$$

where $(A_C)$ = activity of carbon
$(A_{CO})$ = activity of carbon monoxide
$K_3$ = equilibrium constant The equilibrium constant $K_3$ may be calculated from the Gibbs free energy of Reaction (5) by the equation:

$$-\Delta F_0 = RT \ln K_3 \qquad (7)$$

where $-\Delta F_0$ = free energy change
$R$ = gas constant
$T$ = absolute temperature
$ln$ = logarithm to the base $e$ The free energy change at a given temperature is expressed by the following equation, taken from International Critical Tables, volume VII, page 243:

$$\Delta F_0 = -26{,}600 - 2.15 T \ln T + 0.00215 T^2 - 0.0000002 T^3 - 8.20 T \qquad (8)$$

At 1673° K. (1400° C.) the free energy change $$\Delta F_0 = -61{,}398$$

Substituting this value in Equations (7) and (6), according to the principles expressed in my United States patent application Serial No. 20,555, the oxygen activity at 1400° C. can be calculated to be $$(A_{O_2})^{\frac{1}{2}} = 8.2 \times 10^{-9}$$

assuming the activity of both carbon and carbon monoxide to be unity. In the present invention it is desired that the activity of carbon monoxide shall be less than unity and this desirable condition is obtained by diminishing the pressure of the reacting pig iron and slag below the normal atmospheric pressure of 760 millimeters of mercury. This pressure may be reduced, for example, to approximately 76 millimeters of mercury, thereby reducing the activity of carbon monoxide to approximately one-tenth of its former value. By so doing the former value of $$(A_{O_2})^{1/2}$$

as calculated from Equations (6) and (7) is reduced from $8.2 \times 10^{-9}$ to $8.2 \times 10^{-10}$.

If, for the purpose of illustration, it be assumed as in United States patent application Serial No. 20,555, that it is desired to desulphurize pig iron until the sulphur activity reaches a point at which $$(A_{S_2})^{1/2} = 10^{-5},$$

Equation (4) may be solved using this value of $$(A_{S_2})^{1/2}$$

and the previously determined value of $$(A_{O_2})^{1/2} = 8.2 \times 10^{-9}$$

for 760 millimeters of mercury pressure, thus:

$$\frac{(A_{R_xS}) \cdot (3.9 \times 10^{-9})}{(A_{R_xO}) \cdot (10^{-5})} = K_2 \qquad (9)$$

$$\frac{(A_{R_xS})}{(A_{R_xO})} = (1.2 \times 10^3)K_2 \qquad (10)$$

$$(A_{R_xS}) = (1.2 \times 10^3)(A_{R_xO})K_2 \qquad (11)$$

In the present invention, using the illustration previously described for 76 millimeters of mercury pressure where $$(A_{O_2})^{1/2} = 8.2 \times 10^{-10}$$

Equation (11) becomes $$(A_{R_xS}) = (1.2 \times 10^4)(A_{R_xO})K_2 \qquad (12)$$

The value of $$(A_{R_xS})$$

is a measure of the concentration or percentage of $R_xS$ in the desulphurizing slag. From Equation (12) it is evident that as the pressure on the slag and pig iron falls below the normal atmospheric pressure of 760 millimeters of mercury, the value of $$(A_{R_xS})$$

rises proportionally. Thus for a pressure of 76 millimeters of mercury, the lowering of pressure to one tenth normal atmospheric pressure causes $$(A_{R_xS})$$

to be increased ten times. It is therefore very advantageous to submit the desulphurizing slag and pig iron to a pressure less than atmospheric so that the desulphurizing action is intensified.

The amount of the diminished pressure will depend upon the slag chosen and other conditions now to be discussed. For most economical desulphurization it is desirable to have a high ratio of sulphur in the slag to sulphur in the pig iron, that is, a high percentage of $R_xS$ in the slag when desulphurization is finished. This is accomplished by keeping the product $$(A_{R_xO})K_2$$

high through choice of a slag of proper chemical composition, and by keeping the pressure on the slag as far below atmospheric pressure as is practical and economical. At this point it is interesting to note that the conditions attending the desulphurization of pig iron in the blast furnace hearth are not particularly favorable because the pressure is as much as 760 millimeters of mercury or more above atmospheric pressure.

Slags

As a choice of desulphurizing slag, it is preferred to illustrate by a slag whose active desulphurizing oxide is CaO. It has previously been explained that other alkaline earth or alkali oxides can be used. The inventor has found, however, that CaO is a very desirable and economical desulphurizing agent and it is used in the illustrations, but it will be evident that the other oxides described above could be used in a similar manner after proper allowance is made for slight variations in the chemical and physical properties of the other oxides.

CaO in the pure state is not suitable physically for forming a desulphurizing slag due to its high melting point (2570° C.). It is conventional to reduce the melting point of CaO to form readily fusible slags by adding $SiO_2$ and perhaps $Al_2O_3$ and other oxides. Thus, for example, it is possible to form a slag which is free-flowing at 1400° C. having the approximate composition:

| | Percent |
|---|---|
| CaO | 44 |
| MgO | 4 |
| $Al_2O_3$ | 15 |
| $SiO_2$ | 37 |

In such a slag the activity of the lime is reduced by the presence of 37% silica and 15% alumina. Slags of this approximate composition are used as desulphurizing agents in the blast furnace and are capable of building up a 60:1 ratio of the percentage of sulphur in the slag to the percentage of sulphur in the pig iron. It has been found that such a slag can be used in the present invention, especially if the slag and pig iron to be desulphurized are subjected to a diminished pressure of 150 millimeters of mercury or less, thereby causing the sulphur ratio to rise to 100:1 or 200:1 or more depending upon specific conditions.

The foregoing slag may also be adjusted to contain higher or lower silica contents. In general, as the silica content falls the sulphur ratio rises but the minimum free-flowing temperature of the slag rises also. Thus it becomes necessary to add agents such as $CaF_2$ (fluorspar) to make the slag flow properly at operating temperatures. It has been found that the addition of fluorspar in amounts of 5% or 10% or more to slags containing about 45% to 50% CaO and 35% $SiO_2$ is satisfactory. The $SiO_2$ content can also be decreased and slags have been synthesized containing as little as 15% $SiO_2$ or less, and it has been found that such slags are very advantageous especially where the slag and pig iron under treatment cannot be subjected to low pressures.

For example a desulphurizing slag having the composition:

| | Percent |
|---|---|
| CaO | 45 |
| $CaF_2$ | 40 |
| $SiO_2$ | 15 | has been found to be very satisfactory. Such a slag can be readily synthesized by mixing lime and fluorspar of commercial grade, adjusting the silica to the desired percentage by the addition of silica sand, after allowing for the silica present as impurity in the lime and fluorspar. Magnesia present as a normal impurity in a good grade of lime is not objectionable. Alumina present as a small amount of impurity is also not objectionable. Indeed the addition of approximately 5% of alumina seems to be advantageous as it reduces somewhat the melting point of the desulphurizing slag. The above slag flows freely at 1200° C. and this property is very desirable for efficient desulphurization.

Molten pig iron high in sulphur (0.25% S) has been subjected to the action of the lime-fluorspar-silica slag above referred to at 1400° C. for one hour at atmospheric pressure in a refractory container composed of carbon in the form of graphite. The slag and molten pig iron were under strong reducing conditions and the desulphurizing vessel was arranged so as to prevent direct contact with the atmosphere or with combustion gases high in oxygen, carbon dioxide or water. Under these conditions the slag picked up as much as 10.79% sulphur, and the pig iron had its sulphur content reduced to 0.03% sulphur, so that there was more than one hundred times as high a percentage of sulphur in the slag as in the pig iron. In other cases in which the pig iron initially contained only about 0.03% sulphur, the sulphur content of the pig iron was reduced to 0.002% sulphur and the slag picked up 0.11% sulphur.

These good desulphurizing results can be still further improved if the pressure on the slag is reduced, for example to 380 millimeters of mercury, or below. It is to be noted, however, that low pressures such as 30 millimeters of mercury are not to be recommended with slags rich in fluorspar unless adequate means are provided to take care of the volatile products which such slags give off at low pressures. The sulphur content of the iron may be reduced to less than one-half, or less than one-quarter, or even less than one-tenth of that in the iron before treatment by the invention.

A study has been made of the use of soda as a substitute for lime in desulphurizing slags. The desulphurizing action of soda, for example sodium carbonate, on pig iron is well known and this substitution can be made. It is found, however, that pure soda is readily attacked by carbon at temperatures of 1400° C. or even below, producing sodium vapor which is very effective in converting FeS into Na$_2$S and thus desulphurizing the pig iron. The sodium vapor causes difficulty in the handling of soda slags, and the reaction must be managed in such a way as to limit the formation of volatile soda derivatives in order to avoid excessive loss as fume. It is possible to use slags containing Na$_2$O, SiO$_2$ and Al$_2$O$_3$ with other oxides to overcome volatilization loss incident to sodium carbonate. Furthermore the revivification of soda slags to remove sulphur and permit reuse presents special difficulties not present in the case of lime slags.

Detailed reference to the steps necessary when soda slags are used is therefore omitted, and the further discussion is generally confined to slags containing alkaline earth oxides as the preponderant active constituent. However, the use of slags containing soda or other alkali metal oxides as active desulphurizing ingredients, when used as substitutes for alkaline earth oxides such as lime as active ingredients, is claimed herein.

The quantity of oxides of the type R$_x$O in the initial slag should exceed 30% for best results.

Due to the cheapness and freedom from volatilization, it is preferable to use a lime slag, although such preference is subject to change under varying economic and metallurgical conditions.

In choosing the slag, it is desirable to have one which will be of low viscosity and workable at temperatures of 1400° C., and, for this purpose, the slag should preferably be freely fluid as low as 1200° C. or in some cases at 1300° C.

It is very advantageous to use a slag which shows a high ratio of sulphur concentration in the slag after use to sulphur concentration in the desulphurized or partially desulphurized pig iron. If, for example, 0.25% sulphur must be removed from the pig iron and if the slag will take up as much as 12.5% sulphur, then one ton of slag will desulphurize 50 tons of pig iron. It is to be noted that an ordinary coke blast furnace slag can absorb approximately 1.75% sulphur and reduce pig iron to as low as 0.03% sulphur under a pressure as much as 760 millimeters of mercury above atmospheric. It has been found that such an ordinary blast furnace slag when subjected under proper conditions to approximately one tenth normal atmospheric pressure (for example 76 millimeters of mercury pressure), becomes capable of absorbing 6% of sulphur or more and can thereby reduce a high sulphur iron to 0.03% or less. In such a case the ratio of sulphur percentage in the slag to sulphur percentage in the molten pig iron equals or exceeds 200:1.

Thus by the use of diminished pressure it is possible to improve the desulphurizing power of the special synthetic slags such as the one described above containing 45% CaO, 40% CaF$_2$, 15% SiO$_2$, or to improve the desulphurizing power of ordinary blast furnace slags or similar slags of poorer desulphurizing ability to the point where they may be substituted for the special synthetic slags. If slags produced in a blast furnace containing about 35% SiO$_2$ and 40% of lime are to be used, the addition of approximately 5% to 10% of fluorspar is advantageous.

It is obvious that the composition of the slag and the diminished pressure to be used should be chosen to meet the individual case under consideration. Much latitude is offered in the choice of these two factors as is shown by Equations (4) and (12). In general these factors of slag composition and pressure should be chosen so that a ratio of sulphur in the slag to sulphur in the iron should exceed 100:1 and preferably exceed 200:1.

As explained in detail below, it is often advantageous to employ a desulphurizing slag which can be revivified or treated to remove its sulphur so that it can be used over and over again. The lime slags referred to fulfill this requirement. The desulphurizing slag, after it has picked up, for example, 12% sulphur, is revivified by removing sulphur from the slag until, for example, less than 1% sulphur remains. This revivified slag is then used repeatedly to desulphurize further quantities of molten pig iron.

Desulphurization

The pig iron used in the process will in most cases be pig iron produced in the coke blast furnace when operated under conditions of moderate temperature and moderate basicity of the slag suitable to produce pig iron at lower cost but with a higher sulphur content than that ultimately desired. The sulphur content of the pig iron produced in the coke blast furnace under such economical conditions may be 0.25%, 0.3% or even higher. Of course the invention may also be applied to pig iron of normal sulphur content, containing say 0.04% S. The pig iron is tapped from the coke blast furnace, and, ordinarily, separated from the blast furnace slag at the time of tapping. Where the blast furnace slag is to accomplish the desulphurizing, the separation of the pig iron from the blast furnace slag at the time of tapping is not necessary as far as the present invention is concerned. The pig iron is then preferably brought at once into contact with the desulphurizing slag, while the pig iron is still molten from the blast furnace.

The actual desulphurization may, for example, be carried out in a vessel such as that shown in Figures 2 to 5, inclusive, which illustrate a ladle car of the general type disclosed in Pugh United States Patent No. 1,534,187, granted April 21, 1925. The ladle car comprises a ladle body 20, covered with a metallic casing 21 having a cylindrical central portion 22 and conical end portions 23 and 24 which terminate in headers 25 and 26. The headers support trunnions 27, 27', 27², and 27³, which engage bearings 28, 28', 28² and 28³. The bearings 28, 28', 28² and 28³ are supported from a main frame 29, which in turn rests upon any suitable railway trucks 30 and 31, operating upon a track 32.

Figure 2:
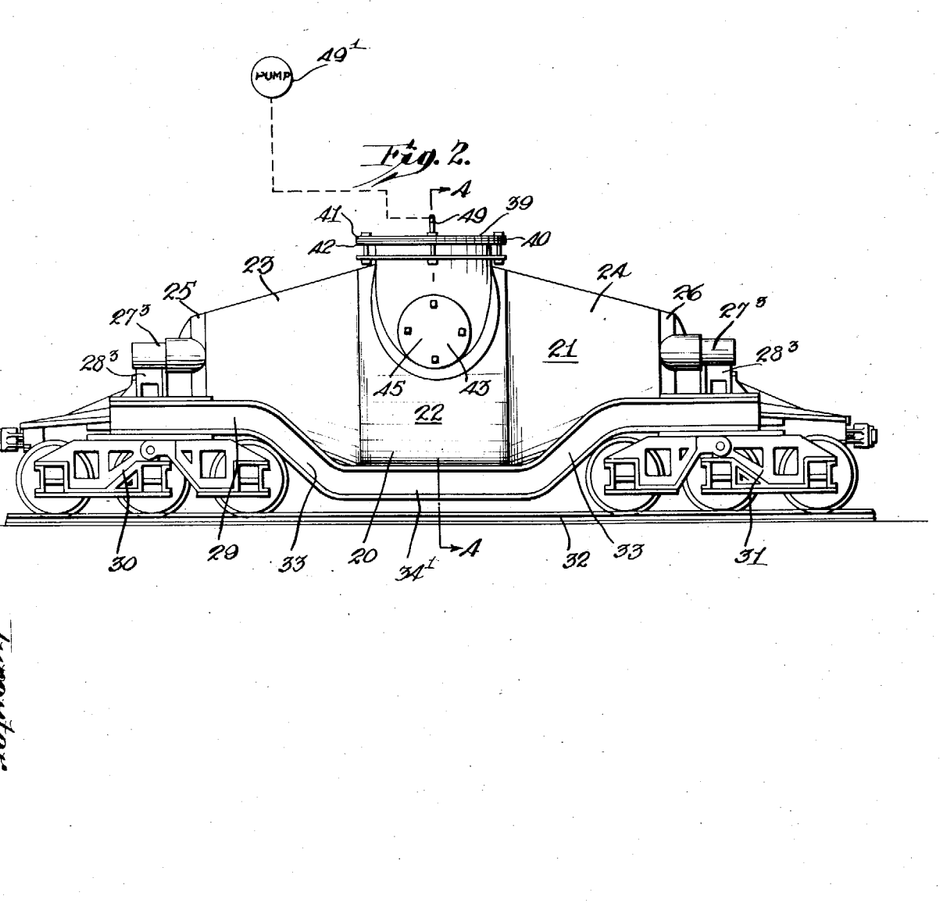
Figure 2 is a diagrammatic side elevation of a desulphurizing vessel which may be used in practicing the invention.
Figures 3, 3A, 4, 5:
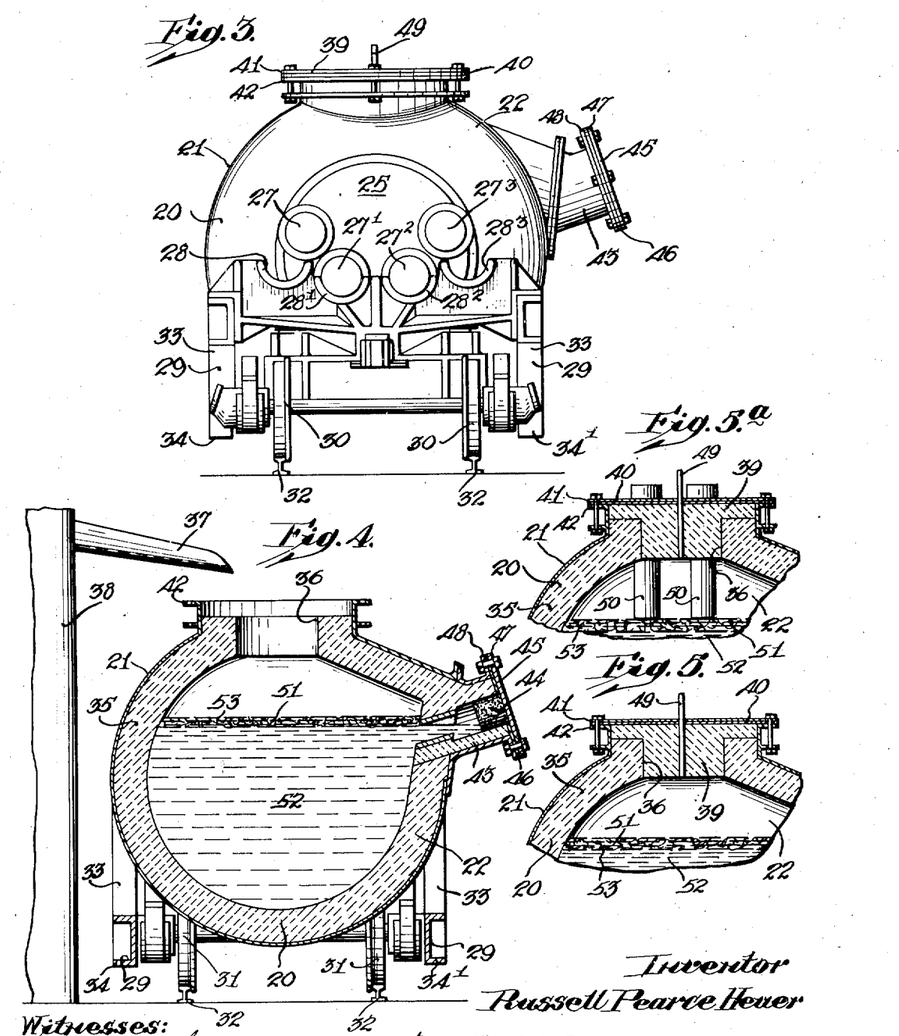

To permit tilting or rocking of the ladle car, the main frame 29 is bowed at 33. The hook of a crane may be engaged with the main frame, as at 34, to lift one side of the main frame, causing trunnions 27' to leave bearings 28' and eventually causing trunnions 27³ to engage bearings 28³. Lifting and lowering at 34' might also be used. The lifting and lowering of one side of the main frame may be used to agitate the liquid contents of the ladle car, and the lifting and lowering at 34 may also be used in tapping the ladle car.

The means of rocking and tilting the ladle car need not be that shown, as any other suitable means may be employed. For example, the reaction vessel of the ladle car may be rotated by a conventional driving band and motor as shown, for example, in Hart United States Patent No. 1,916,170, granted June 27, 1933.

Inside the casing 21 is a lining 35 of suitable refractory material. It is contemplated that this will normally be graphite, or other suitable carbon refractory, although any other suitable lining material, such as magnesite, for example, might be used. If carbon be used as a lining, it may be rammed in place with a tar binder or built into the desired form from blocks which have previously been fired.

Inlet to the ladle car is provided through a charging opening 36, from a runner or launder 37 of a coke blast furnace 38. The charging opening may be closed by a door 39 which makes a gas-tight seal through gasket 40 between flanges 41 and 42.

The discharge of slag from the ladle car is facilitated by a pouring spout 43 below the charging inlet. When the pouring spout is used, the ladle car will be tilted, and the pouring spout will normally be closed when not in use by a plug 44 and a door 45 making a gas-tight seal through gasket 46 between flanges 47 and 48. Gas-tight inspection doors may be provided if desired. The ladle car is provided with a connection 49 leading to a suitable pump 49' for maintaining the desired pressure below the normal atmospheric pressure.

An atmosphere of reducing gas, primarily carbon monoxide, under a pressure below atmospheric pressure is maintained in the vessel by the pumps. The carbon monoxide comes from the reaction of any oxidizing substances with carbon present. In order to maintain this pressure the entire steel shell of the ladle and all openings are made gas tight.

It is not ordinarily necessary to heat the ladle car, as the pig iron will normally have sufficient superheat from the blast furnace to keep the contents of the desulphurizing vessel molten and to melt the desulphurizing slag when it is not charged molten. For the purpose of illustrating diagrammatically that any suitable non-contaminating heating means may be applied to the ladle car, electrodes 50 are shown in Figure 5a (one set only being visible in this figure), intended to be connected to a suitable source of electrical energy to supply arc heating. No attempt in the illustration has been made to show either electrical insulation or protection against air leakage about or for the electrodes as both insulation and closure against leakage may be taken care of in various well recognized ways. In fact the leakage incident to the electrodes need not be taken care of as the electrodes and the covers carrying them may be replaced by gas-tight doors after heating and before applying vacuum.

Figure 6:
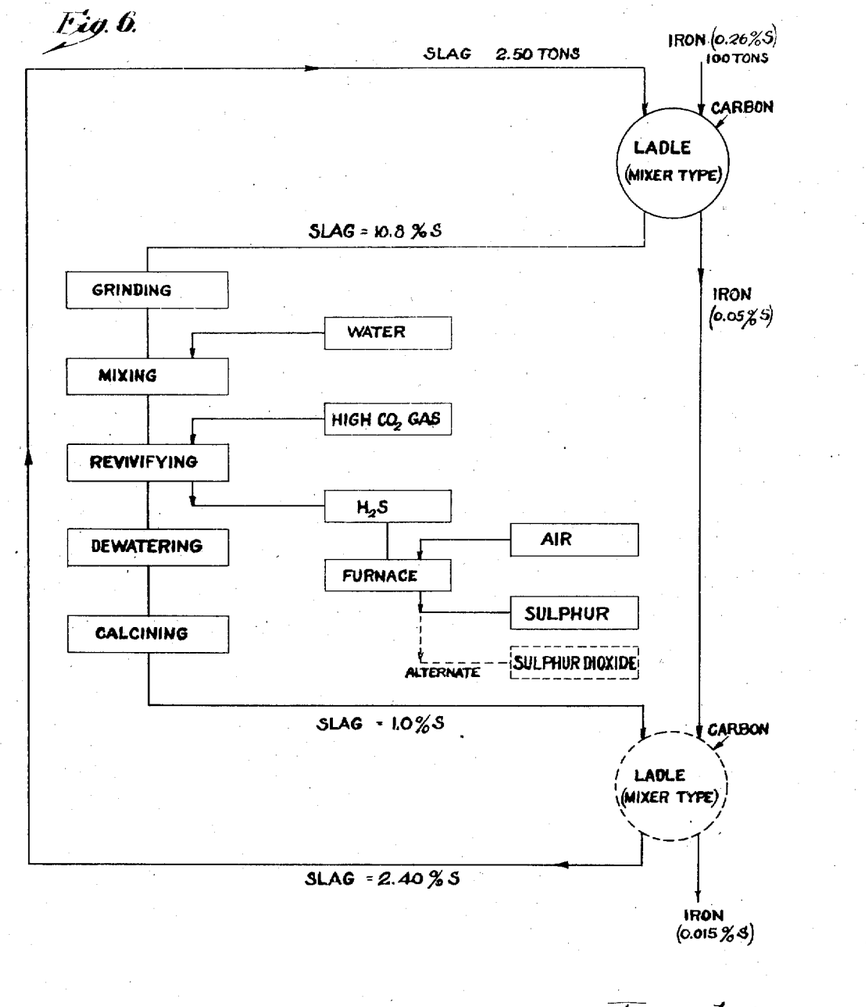
Figure 6 is a chart of a desirable process of desulphurizing pig iron and revivifying the slag in accordance with the invention.

An illustrative cycle of operations is indicated in Figure 6. The specific values given on this figure vary somewhat from those mentioned in other examples, and are given as a particular instance of the process, without intention to limit the disclosure.

The ladle car containing about 2.5 tons of molten desulphurizing slag, preferably slag which has previously been used to desulphurize a previous charge of molten pig iron, is filled with about 100 tons of molten pig iron from the coke blast furnace flowing through the blast furnace runner 37, and containing as much as 0.3% sulphur or more (say 0.26% sulphur). The molten slag is held in contact with the molten iron under the proper diminished pressure for as much as one hour or more until the sulphur content of the molten pig iron has fallen to between about 0.03% sulphur and 0.10% sulphur (say 0.05% sulphur) and the sulphur in the slag has increased to perhaps 5% sulphur or a much higher figure (say 10.8% sulphur). With good operating conditions and efficient slags, as much as 12% sulphur can be built up in the slag with only 0.04% or 0.05% sulphur in the pig iron. It is desirable to have a high concentration of sulphur in the slag when the slag is to be revivified since the amount of slag necessary is thereby reduced.

At this stage the slag is then removed from the ladle car by the pouring spout 43.

In the preferred process about 2.5 tons of a second slag similar in composition to the first slag are now added, and further desulphurization of the molten pig iron is accomplished.

The pig iron and slag are maintained in contact with one another preferably for an additional hour or more under the proper diminished pressure, and the sulphur content of the pig iron may thereby be reduced to 0.015% sulphur, 0.01% sulphur or even less if desired. The sulphur content of the second slag may increase from a negligible quantity at the time it is charged to 1% sulphur or 2% sulphur or more. The molten iron is then separated from the second slag, as by tapping the second slag, then removing the molten iron, and then pouring back the second slag into the ladle car, or by retaining the molten slag in the ladle car during tapping of the iron, for example by submerging the pouring opening below the slag level before removing the plug from the pouring opening and then retaining the slag level above the pouring opening during pouring from the ladle car.

The ladle car is then returned to a source of high sulphur pig iron to receive a further charge of say 100 tons, and the further charge is desulphurized by a first treatment with the slag which was used as the second slag on the previous charge, by removal of the high sulphur slag produced thereby, by addition of fresh slag and so on.

It will of course be understood that a stationary ladle, mixer or furnace can be employed, if it is suitably equipped to maintain sufficiently reducing conditions and suitably low pressures.

The amount of slag required per ton of pig iron desulphurized will depend on the amount of sulphur to be removed from the pig iron and the amount of sulphur picked up by the slag. If, for example, a high sulphur pig iron containing 0.26% sulphur is desulphurized to 0.015% sulphur, then, for every 100 tons of pig iron, 0.245 tons of sulphur must be taken up by the slag. If the slag picks up 9.8% sulphur, 2.5 tons of slag will be necessary to treat 100 tons of pig iron.

In desulphurizing high sulphur pig iron, a stepwise process as described above is quite efficient since it removes the sulphur with a small amount of slag, and necessitates regeneration of a smaller amount of slag for further desulphurization. For efficient desulphurization the ratio of sulphur percentage in the slag to sulphur percentage in the pig iron may be as much as 250:1 or even a higher ratio. Thus a desulphurizing slag in contact with molten pig iron having 0.015% sulphur might have picked up 2.5% sulphur from the pig iron.

If 100 tons of iron were being treated to remove 0.25 ton of sulphur, 10 tons of slag might be needed if the desulphurization were done in a single step.

If the pig iron were desulphurized in a stepwise process as shown in Figure 6, reducing the sulphur first to about 0.05% sulphur and separating a sulphur-rich slag containing 10.8% sulphur, then adding a second and fresh slag to remove the balance of the sulphur in the iron down to 0.015% sulphur, then separating the iron from the second slag containing about 2.4% sulphur for use in the preliminary treatment of the next charge of sulphur-rich pig iron as above described, the removal of 0.245 ton of sulphur from 100 tons of iron can be accomplished with only 2.5 tons of slag, although 3.5 tons of slag, or more, may be used.

By stepwise treatment it is possible to reduce the sulphur content of molten pig iron from a value in excess of 0.10%, say 0.3%, to less than 0.01%, in one or two hours, by slags which aggregate less than 8% and generally not more than 5% of the weight of the pig iron.

For best results the slag used should be very liquid at the temperature prevailing. It was found that 1400° C. was an economical and desirable temperature, although higher or lower temperatures may be used. If the slag flows freely at 1200° C., it will of course be very liquid at 1400° C.

In the case of a lime slag, sulphur is retained in the slag as calcium sulphide. Iron sulphide present in the iron phase dissociates:

$$FeS \rightarrow Fe + \tfrac{1}{2}S_2 \qquad (1)$$

The sulphur reacts with the lime or other $R_xO$ oxide of the slag thus:

$$CaO + \tfrac{1}{2}S_2 \rightarrow CaS + \tfrac{1}{2}O_2 \qquad (13)$$

To drive the above reaction to the right and desulphurize the pig iron it is necessary to keep the oxygen activity low by reducing agents. The high carbon content of the pig iron itself has some reducing action, and it is decidedly preferable to desulphurize the iron while it still has its pig iron carbon content to aid in reduction then at a later stage when its carbon content has been lowered, for example to that of steel. In many cases the carbon content of the pig iron itself will serve to maintain reducing conditions when air, carbon monoxide and water are excluded.

It is desirable to employ a carbon lining in the ladle car, and this serves to assist materially in maintaining reducing conditions. It is also very desirable where a carbon lining is used, and much more desirable where a carbon lining is not used, to introduce coke or charcoal into the slag, maintaining a substantial body of carbon floating on the molten pig iron. In the slag 51 floating on the molten pig iron 52 carbon is seen at 53, in excess of that which can dissolve in the pig iron.

When the removal of sulphur under vacuum conditions has been accomplished and before the vacuum has been released, i. e. before opportunity for resumption of normal atmospheric conditions in the desulphurizing vessel, it is desirable to insert a protecting gas under atmospheric pressure and free from contaminating quantities of oxygen, carbon dioxide, carbon monoxide and water vapor—for example nitrogen. If a gas, so free from contamination, be admitted under atmospheric pressure to fill up the space, resulphurization of the pig iron will be prevented during the short interval while the slag is being separated from the iron.

If other reducing agents than carbon be desired to remove oxygen in reaction (13), calcium carbide, ferrosilicon, or other reducing ferro alloys may be added to the slag. The lower the oxygen activity, the higher the possible ratio of sulphur in the slag to sulphur in the pig iron at the end of desulphurization, the more complete the desulphurization and the more rapid the reaction.

To facilitate the desulphurization, agitation of the metal and slag may be used. Such agitation may be produced by rocking or rotating the ladle car, by raising and lowering one end of the ladle car, etc.

The desulphurized pig iron from the ladle car may be used in any form in which the pig iron is suitably employed, as for example for gray iron or malleableized castings, etc. It is contemplated, however, that a large part of the desulphurized pig iron will be used in steel-making furnaces for the production of steel in much the same manner that the conventional low sulphur product of the coke blast furnace is now used.

Where steel is made, the economy in production of the raw material will effect an over-all economy in the steel process. A further important advantage in steel making is that it will in no case be necessary to take any precautions in steel making to eliminate sulphur, as is sometimes necessary when the blast furnace pig iron runs excessively high in sulphur. This is of especial importance in the manufacture of electric steel, in which case sulphur elimination takes a substantial part of the time and contributes to the cost. Nor will it be necessary to reject certain ores or coke on account of the sulphur content when smelting pig iron for steel-making purposes.

The detail of the refining of the pig iron to make steel is not part of this invention, and the desulphurized pig iron may be used in the acid or basic open hearth, the electric furnace, the Bessemer converter or in any other suitable manner to produce steel.

Revivification

It has been previously explained that a wide choice of desulphurizing slags is accorded in this invention, and that special slags containing high percentages of fluorspar or other expensive components may be used.

To utilize these expensive slags economically the inventor proposes to revivify the spent slags and use them over and over again. In many cases, however, a special slag may not be required. For example, let us consider the desulphurization of a pig iron containing about 0.10% S. One hundred tons of such pig iron could be charged into the mixer ladle with approximately 4.5 tons of molten slag taken simultaneously from the blast furnace. If desired 0.5 ton of fluorspar could be charged. The slag and pig iron could be maintained for example under a pressure of 76 millimeters of mercury for one hour or more. Under such conditions the sulphur in the iron would be reduced to less than 0.025% (for example to 0.02%). Such reduction would require the 5.0 tons of initial slag to absorb 0.08% of 100 tons or 0.08 ton of sulphur, the equivalent of 1.6% sulphur in the slag.

Since the initial slag above was obtained from a blast furnace it may have contained initially about 1.5% sulphur. Thus the final slag would contain 1.5% plus 1.6% or 3.1% sulphur. This condition would require a ratio of the percentage of sulphur in the slag to the percentage of sulphur in the iron of 155:1. After desulphurization, the molten iron could be tapped from the ladle before the slag or the slag could be separated first. In separating slag and metal it is desirable to avoid any excessive oxidation whilst the slag and metal are in contact since this will cause sulphur to leave the slag and reenter the metal. Similarly, after the desulphurization is completed it is desirable to separate slag and metal as soon as possible after the pressure has been restored to normal atmospheric pressure.

In this last illustration the desulphurizing slag need not be revivified for use over again since fresh quantities of molten blast furnace slag could be obtained more cheaply than the used slag could be revivified. The choice as to whether special slags should be used or whether the cheaper blast furnace or similar slags will suffice will depend upon individual conditions, the sulphur contents of the initial and final iron, the cost of revivification, etc.

There are several ways of revivifying the desulphurizing slag of the invention to lower its sulphur content so that the slag may be used again to desulphurize a further charge of pig iron, and so that the sulphur may be recovered. It is contemplated that the desulphurizing slag may be used repeatedly to treat further quantities of pig iron, with revivification when the sulphur content becomes so high that further desulphurization is impeded, and with addition of fresh slag when the losses of slag necessitate augmenting the quantity. It will be noted that, in accordance with the invention, the conditions are always reducing when the desulphurizing slag is in contact with the molten pig iron, thus minimizing the picking up of phosphorus, manganese, etc., by the slag. If the slag were in contact with the iron when oxidation was possible, pick-up of phosphorus, manganese, etc., by the slag would be excessive. Naturally, a substantial pick-up of phosphorus, for example, would render the slag unusable even though it were revivified to lower its sulphur content, and therefore it is important to avoid having contact between the molten pig iron and the desulphurizing slag under unsuitable oxidizing conditions.

The slag is revivified while it is out of contact with the molten pig iron and preferably after separation from the desulphurizing vessel, as revivification involves oxidizing reactions which would be harmful to desulphurization.

It is preferred to effect the revivification by the principles underlying the process of Claus and Chance as used for removing the sulphur from calcium sulphide present in tank wastes produced in the LeBlanc soda process. See George Lunge, Sulphuric acid and alkali (D. Van Nostrand Co., N. Y., 1909) volume 2, part 2, page 943 et seq. This revivification process applies to slags containing any of the alkaline earth sulphides, but calcium sulphide, being the cheapest, is referred to below in the specific example. In accordance with this process the desulphurizing slag containing perhaps 35% of calcium sulphide is reduced to a fine powder, preferably to a state of subdivision such that it will pass through a 50 mesh per linear inch screen. It is of course possible to reduce the slag to a powder by crushing and grinding and such a step is indicated on the process chart of Figure 6. It has been found, however, that it is a great convenience and economy to use a slag which is self-disintegrating, due to the volume changes which the alkaline earth silicates undergo when slowly cooled. The slag comprising:

|     | Per cent |
|-----|----------|
| CaO | 45 |
| $CaF_2$ | 40 |
| $SiO_2$ | 15 | is self-disintegrating, as it breaks up into a fine powder when cooled slowly to room temperature.

The following slag is also self-disintegrating

|     | Per cent |
|-----|----------|
| CaO | 55 |
| $CaF_2$ | 33 |
| $SiO_2$ | 12 | as are also the slags having compositions between those of the two examples just given. Self-disintegration of desulphurizing slags has been noticed in the case of the high lime-fluorspar slags used in the electric steel furnace.

However the slag may be reduced to a powder, whether by crushing and grinding or by self-disintegration, it is next mixed with water to form a slurry. The slurry is then subjected to the action of carbon dioxide gas, and undergoes the following reactions $$CaS + H_2O + CO_2 \rightarrow CaCO_3 + H_2S \quad (14)$$

The hydrogen sulphide liberated may then react $$CaS + H_2S \rightarrow Ca(SH)_2 \quad (15)$$

Further treatment with carbon dioxide causes the reaction $$Ca(SH)_2 + CO_2 + H_2O \rightarrow CaCO_3 + 2H_2S \quad (16)$$

Any suitable source of carbon dioxide may be employed. As a source of carbon dioxide which is very convenient and economical at an iron or steel plant, it is preferred to use the products of combustion issuing from furnaces employing blast furnace gas as fuel. For example, the products of combustion from the hot blast stoves used in preheating the air for blast furnaces may very conveniently and cheaply be employed. It is desirable that these gases contain as much carbon dioxide as is convenient. Any sulphur dioxide in these gases should be taken into account, but small quantities of sulphur dioxide are not seriously objectionable.

The products of combustion should be substantially cooled before being introduced into the slurry, to prevent difficulty through the production of steam in the revivification system.

Figure 7:
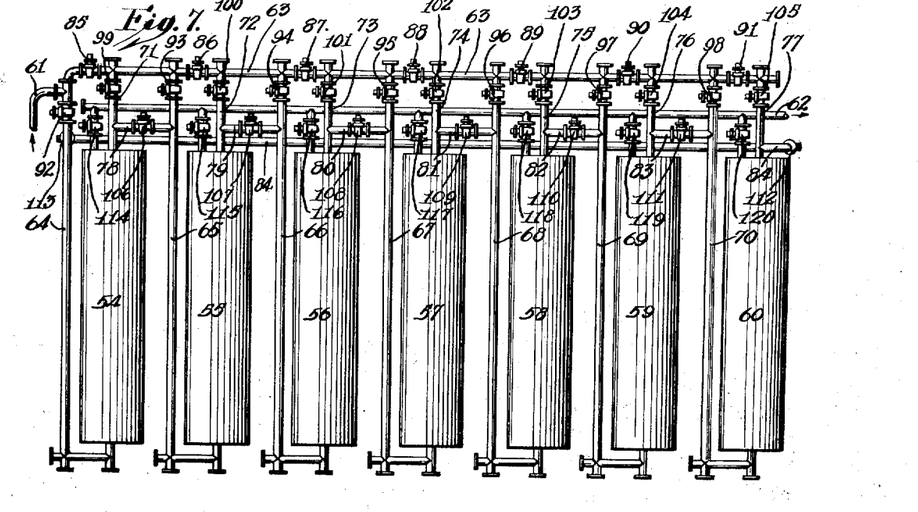
Figure 7 is a diagrammatic view of apparatus which may be used for revivifying the slag.

The products of combustion are preferably blown or bubbled through the slurry in cast iron vessels such as are shown in Figure 7. Each of the vessels 54, 55, 56, 57, 58, 59 and 60 is a separate cylindrical tank about 3 feet (0.9 meter) in diameter and 15 feet (4.6 meters) tall.

It is preferable to use about seven such tanks in conjunction, the exit gases from the tank receiving the gases rich in carbon dioxide passing through a series of other tanks to effect the desired reactions.

Each tank has a nitrogen cycle and a hydrogen sulphide cyle. During the operation of a given tank as the first tank in the train, the exit gases from this tank are initially nitrogen, which is inert, excess carbon dioxide and hydrogen sulphide produced by reactions (14) and (16). These gases are passed into other tanks where both hydrogen sulphide and carbon dioxide are absorbed, until the final exit gas is substantially nothing but nitrogen, which can be exhausted.

As the gas treatment continues, a stage is reached in one of the tanks in which the exit gases are rich in hydrogen sulphide and low in carbon dioxide. Such gases may be withdrawn and utilized for their sulphur content.

After sufficient carbon dioxide has been absorbed in a particular tank to complete reactions (14), (15) and (16), the slurry may be withdrawn from this tank and the gas rich in carbon dioxide may be applied to another tank. The slurry withdrawn from the first tank will be found to contain less than 1% of sulphur.

At any time, gas rich in carbon dioxide enters the tanks of Figure 7 through the inlet pipe 61 and the exit gases leave through the outlet pipe 62. An inlet header 63 runs across all of the tanks and may be used to carry gas rich in carbon dioxide to any of them.

Each tank is equipped with a down-flow pipe 64, 65, 66, 67, 68, 69 or 70, extending from the inlet header 63 to the bottom of the tank. Each tank also has at its top an up-flow pipe 71, 72, 73, 74, 75, 76 or 77, which joins the inlet header 63. From the up-flow pipe of each tank to the down-flow pipe of the next tank is a cross-connection 78, 79, 80, 81, 82, 83 or 84 (the cross-connection 84 is a long pipe extending across the back of the tanks in Figure 7). The various elbows and T's are provided with suitable cap-flanges to permit ready access to the pipes.

Numerous valves are placed to permit change in the direction of gas flow. Between the junction with each down-flow pipe and the junction with the next up-flow pipe, the inlet header 63 has a valve 85, 86, 87, 88, 89, 90 or 91.

Between its junction with the inlet header 63 and its junction with its cross-connection, each down-flow pipe has a valve 92, 93, 94, 95, 96, 97 or 98. The inlet 61 lies between the valves 85 and 92.

Between its junction with the inlet header 63 and its junction with its cross-connection, each up-flow pipe has a valve 99, 100, 101, 102, 103, 104 or 105. Each cross-connection 78, 79, 80, 81, 82 or 83 has a valve 106, 107, 108, 109, 110 or 111, while the cross-connection 84 has two valves 112 and 113. Each tank is connected with the outlet 62 through a valve 114, 115, 116, 117, 118, 119 or 120.

If it be assumed that the tank 60 is out of service, having its revivified slag removed, for example by taking off a cap-flange at the bottom, permitting air to enter at the top, and allowing the slurry to flow into any suitable drainage system, the tanks may operate as follows. Gas high in carbon dioxide entering through the inlet 61 takes a route through valve 92 and down-flow pipe 64 into the bottom of tank 54 and bubbles up through tank 54.

A mixture of carbon dioxide, hydrogen sulphide and nitrogen may issue from tank 54. This gas is passed by up-flow pipe 71, cross-connection 78, including valve 106 in open position, and down-flow pipe 65 into the bottom of tank 55.

Most of the carbon dioxide and hydrogen sulphide are absorbed in tank 55, but the gas is passed through up-flow pipe 72, cross-connection 79, including valve 107 in open position, and down-flow pipe 66 into the bottom of tank 56. In tank 56 the remainder of the carbon dioxide and hydrogen sulphide are absorbed, and the effluent gas is substantially nitrogen, which passes through valve 116 into outlet 62. During the nitrogen cycle this effluent is allowed to escape.

As the blowing of tank 54 continues, more hydrogen sulphide passes over into tanks 55 and 56, and eventually the quantity of hydrogen sulphide in the effluent gas from tank 56 becomes appreciable. At this point, the effluent gas is led through tank 57 by closing valve 116 and directing the gas through up-flow pipe 73, cross-connection 80 (valve 108 in open position) and down-flow pipe 67 into the bottom of tank 57, and then by outlet valve 117 into outlet 62. With increase in the hydrogen sulphide content of the effluent gas from tank 57, it may be desirable to add tank 58 to the train by closing outlet valve 117 and opening cross-connection valve 109 and outlet valve 118.

As the blowing of tank 54 proceeds further, the effluent gas from tank 56 (which is being carried to tanks 57 and 58) reaches such a high concentration of hydrogen sulphide that it can be utilized to recover the sulphur. This is the end of the nitrogen cycle and the beginning of the hydrogen sulphide cycle. Tanks 57 and 58 are cut out of the train by opening outlet valve 116 and closing cross-connection valves 108 and 109 and outlet valve 118. The outlet 62 is connected to suitable storage or recovery mechanism. As the blowing of tank 54 continues still further, the hydrogen sulphide content of the effluent gas from tank 56 decreases and carbon dioxide begins to come over into the effluent gas from tank 56. This is the end of the hydrogen sulphide cycle and the beginning of another nitrogen cycle. Other tanks are then put back in train, for example by opening valves 108, 109 and 118, and closing valve 116. Finally the contents of tank 54 are completely revivified and gas rich in carbon dioxide is led to tank 55 by closing valves 92 and 106 and opening valves 85 and 93. Tank 54 can now be emptied and refilled with slurry to be revivified. At the proper times in the cycle for tank 55, tank 59 is added to the train. In general, other valves not mentioned during the above discussion are kept closed until it is necessary to open them when other tanks are in service.

The above discussion is merely illustrative of one manner of using the tanks, and it is not intended to limit the disclosure, as other apparatus may be employed or this apparatus may be used in other ways.

The revivified slag can be removed from the tank in which the process is completed, filter pressed or run through a Dorr thickener or similar apparatus, dried and used for further desulphurization of additional charges of pig iron. The drying may be done in a rotary drier if desired and the charge issuing from the drier may attain temperatures approximating 1000° C. At these temperatures, calcium carbonate is changed to calcium oxide. This hot discharge material can be placed in suitable containers to conserve its heat content and used as a desulphurizing slag for more pig iron.

It will be evident that the compounds used to revivify the slag in accordance with the above processes, namely water and carbon dioxide, are the very substances whose presence in substantial quantities is undesirable during desulphurization and which are preferably excluded from the desulphurizing vessel.

The point at which the slag is desulphurized will depend, of course, upon the exact process used. If the desulphurization is to be accomplished in stepwise manner, each desulphurizing slag is used twice, as a second slag on one charge and a first slag on the next charge, before it is revivified. It would of course be possible to use the same slag three or a greater number of times before revivification, but this would complicate the process. In any case, when the sulphur content of the slag reaches a predetermined value, the slag is separated from the molten pig iron and revivified.

The gas rich in hydrogen sulphide obtained from revivification may be used for its sulphur content. For example, it may be burned to sulphur dioxide by mixing it with sufficient air, and the sulphur dioxide may be made into sulphuric acid or other suitable compounds. Or, in the presence of a suitable catalyst, the hydrogen sulphide may be burned directly to sulphur trioxide. The hydrogen sulphide may also be converted into elemental sulphur by combustion with the required amount of air in accordance with the following reaction:

$$H_2S + \tfrac{1}{2}O_2 \rightarrow H_2O + \tfrac{1}{2}S_2 \qquad (17)$$

Whether the sulphur be changed to sulphuric acid, recovered as elemental sulphur or in some other form, the value of the resulting product may be credited against the cost of revivifying the slag, and may in some cases more than pay for the cost of revivification.

Figure 6 shows, by way of example, a series of steps which may be employed in the process. The ladle shown at the top of the chart may suitably contain 100 tons of molten pig iron of say 0.26% sulphur content. Into the ladle is charged about 2.5 tons of a first lime-fluorspar desulphurizing slag containing about 2.40% sulphur. This high sulphur content is due to previous desulphurizing use of the slag subsequent to revivification. After suitable contact between the molten pig iron and the first desulphurizing slag in the ladle, the slag is separated from the pig iron. The first slag now contains, for example, 10.8% sulphur.

The slag is now ground to say 50 mesh per linear inch or allowed to self-disintegrate by slow cooling and pre-selection of the proper composition. The ground slag is then mixed with water to form a slurry and treated with a gas high in carbon dioxide, by which the slag is revivified, and hydrogen sulphide gas driven off. The hydrogen sulphide gas may be burned in a suitable furnace to liberate sulphur, or, in the alternative, to form sulphur dioxide. The revivified slurry is next dewatered and calcined to produce a revivified slag containing, say 1% of sulphur.

The revivified slag is then supplied to a subsequent charge in the ladle and there used as a second slag for treating pig iron which was initially desulphurized with a previous slag. The pig iron before treatment with the second slag may have a sulphur content of say 0.05% sulphur, but after treatment with the second slag its sulphur content will drop to perhaps 0.015% sulphur. The sulphur content of the slag, in the meantime, will increase from about 1% to about 2.40%. This second slag is then available for use as a first slag to treat a new charge of pig iron.

Through both of the desulphurizing treatments, the ladle is maintained under reducing conditions by the presence of carbon and the positive exclusion of the atmosphere and combustion gases high in carbon dioxide and water vapor. The mixture of oxides of carbon present in the ladle is predominantly reducing due to the excess of carbon.

It is contemplated that there will be certain losses of slag during the desulphurizing process, and that certain small amounts of impurities may be picked up, both of which features will necessitate additions of fresh slag-making materials from time to time. By the use of proper refractories in the ladle car, by the maintenance of reducing conditions when the slag is in contact with the molten pig iron, and by suitable treatment with carbon dioxide followed by proper processing of the slurry produced in that operation, the fresh slag-making materials required can be kept to a minimum in order to effect, to the fullest extent, the economies made possible by repeated use of the slag.

One process of revivifying the slag by driving off the sulphur as a volatile sulphur component in the form of hydrogen sulphide has just been discussed. This process may be varied by treating the powdered slag at higher temperature with steam and carbon dioxide gas, instead of carrying out the process by treating a slurry at moderate temperature.

Figure 6A:
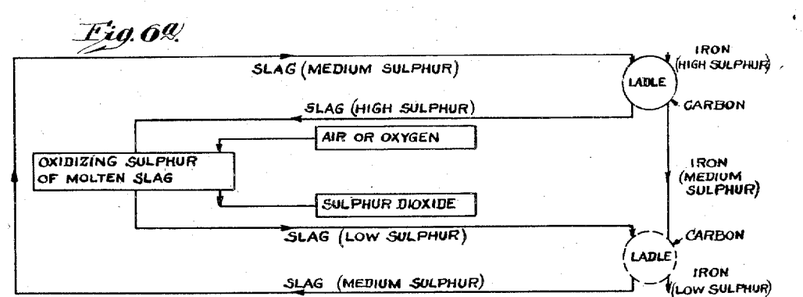
Figures 6a, 6b and 6c are charts of various processes of revivifying the slag in accordance with the invention.

There are a number of other processes by which revivification may be accomplished. For example, as indicated in Figure 6a, sulphur may be removed from the slag directly as sulphur dioxide gas, by maintaining the high-sulphur slag molten and at high temperature after it is removed from the ladle car and blowing air or oxygen through the slag. In this way sulphur dioxide will form readily and the sulphur content of the slag may be effectively reduced.

Figure 6B:
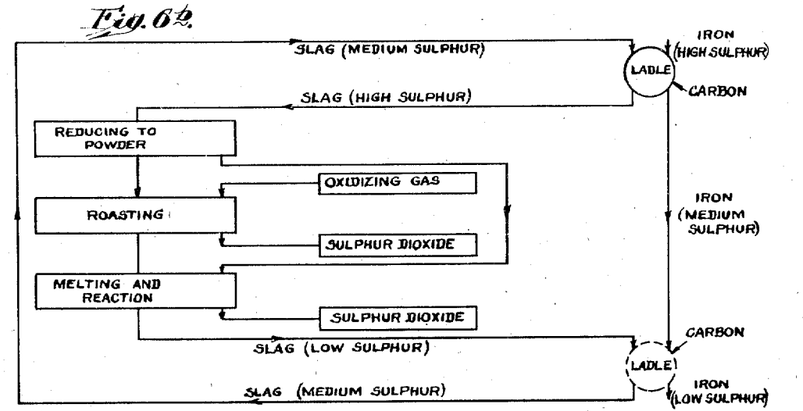

Another process of revivifying the slag, as shown in Figure 6b, is to allow it to cool, and reduce it to a fine powder, as by self-disintegration or by crushing and grinding. A portion of the slag is then roasted in a conventional furnace used for roasting sulphides, desirably to a temperature of about 1000° C. Calcium sulphide is thereby changed to calcium sulphate and some of the sulphur is driven off as sulphur dioxide.

The slag containing calcium sulphate is then mixed with a theoretical quantity of unroasted slag and melted to cause calcium sulphide and calcium sulphate to react:

$$CaS + 3CaSO_4 = 4CaO + 4SO_2 \qquad (18)$$

This reaction is carried out with the slag in molten condition at about 1200° C. to 1400° C. In this way the greater part of the sulphur from the sulphur-rich slag is driven off as sulphur dioxide, and may be used for manufacturing sulphuric acid or in other suitable manner.

A serious difficulty with both of the last-mentioned processes for revivifying the desulphurizing slag is that they require that the slag be maintained molten under oxidizing conditions. Slags high in lime and calcium fluoride are rather corrosive to refractories other than carbon and, while carbon may be used in the ladle car under reducing conditions, it may not be used in operations involving the volatilization of sulphur dioxide where oxidizing conditions are necessary. It is therefore obligatory to have recourse to magnesite and similar refractories, and magnesite brick may be attacked by the slag.

Figure 6C:
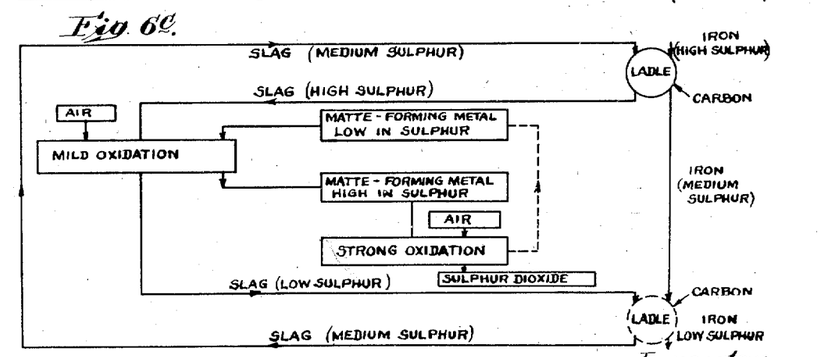

Another process for revivifying the slag, as indicated in Figure 6c, involves the conversion of the sulphur in the slag to a metal sulphide capable of forming a molten phase immiscible with the molten slag, known as a matte. Copper is a suitable matte-forming metal; nickel might also be used. A sulphide of the type $R_xS$ reacts with a matte-forming metal thus $$R_xS + 2Cu + \tfrac{1}{2}O_2 \rightarrow R_xO + 2Cu_2S \qquad (19)$$

Molten slag is brought into contact with molten copper preferably at about 1200° C., and sufficient oxidation is brought about, as for example by blowing air mildly into the copper. Cuprous sulphide forms and enters the layer of copper below the slag. The revivified slag may subsequently be separated from the matte and used for desulphurizing a further charge of pig iron.

The sulphur picked up by the copper may be eliminated by intensive oxidation of the matte through vigorous blowing with air, as for example in the conventional copper matte converter:

$$Cu_2S + O_2 \rightarrow 2Cu + SO_2 \qquad (20)$$

After removal of the sulphur from the copper, the copper bath may be used to desulphurize more slag.

The decision as to whether to revivify the slag by a wet process at low temperatures to eliminate hydrogen sulphide or by a dry process at high temperatures will depend upon the factors prevailing in individual cases. It is considered, however, that the wet process will be more economical in many instances.

Numerous examples have been given herein to aid in practicing the invention. It is not intended, however, to limit the disclosure by reason of the inclusion of these examples except where limitations are included in the claims or indicated by the specification to be essential.

Where reference is made herein to atmospheric pressure, it is intended to designate the prevailing atmospheric pressure.

It will be evident that, by exposing the pig iron to the desulphurizing slag under a pressure below atmospheric pressure for a sufficient duration, a higher ratio between the sulphur in the slag and the sulphur in the pig iron can be built up than would be obtained with the same slag under atmospheric pressure. Thus under reduced pressure the same desulphurization may be obtained with a smaller quantity of slag than under atmospheric pressure, or under reduced pressure more complete desulphurization may be obtained than under atmospheric pressure with the same quantity of slag, or desulphurization may be obtained under reduced pressure with a slag which would not desulphurize or might even sulphurize under atmospheric pressure.

It will also be evident that the rate of desulphurization by a given slag is increased where the pressure is reduced below atmospheric pressure, so that the time required to produce a given desulphurization is lowered with respect to the time required at atmospheric pressure. Thus in many instances a desulphurization slag under reduced pressure will build up a higher ratio of sulphur in the slag to sulphur in the pig iron in about the same time that it would build up a lower and maximum ratio under atmospheric pressure.

In view of my invention and disclosure, variations and modifications to meet individual whim or particular need will doubtless become evident to others skilled in the art, to obtain all or part of the benefits of my invention without copying the process shown, and I, therefore, claim all such in so far as they fall within the reasonable spirit and scope of my invention.

Having thus described my invention, what I claim as new and desire to secure by Letters Patent is:

1. The process of producing desulphurized pig iron, which comprises smelting iron ore in a coke blast furnace under conditions of temperature and basicity of the slag suitable to produce pig iron at lower cost, but with a higher sulphur content in the iron than that ultimately desired, transferring the pig iron from the blast furnace, and subsequently treating the molten pig iron under reducing conditions with a basic slag capable of removing sulphur from the pig iron while subjecting the slag and pig iron to a pressure less than atmospheric pressure to facilitate the desulphurizing reaction.

2. The process of producing desulphurized pig iron, which comprises smelting iron ore to produce pig iron containing more sulphur than the content ultimately desired, treating the pig iron as a wholly separate operation subsequent to production of the pig iron under reducing conditions with a basic slag containing more than 30% of oxides of the type $R_xO$, where R is a metal of the group consisting of alkaline earth metals and alkali metals and $x$ is a numeral determined by the valence of the metal, and subjecting the slag and pig iron during the treatment to a pressure less than atmospheric pressure to facilitate the desulphurizing reaction.

3. The process of desulphurizing pig iron, which comprises smelting iron ore in a coke blast furnace to make pig iron under conditions which produce a substantially higher sulphur content than that ultimately desired, transferring the pig iron from the coke blast furnace; subsequently subjecting the molten pig iron under reducing conditions to a basic slag containing a substantial quantity of lime and fluorspar and subjecting the slag and pig iron to a pressure less than atmospheric pressure to facilitate the desulphurizing reaction.

4. In the process of desulphurizing iron, the step which consists in treating molten iron with a basic desulphurizing slag while subjecting the slag and iron to a pressure less than atmospheric pressure, for a duration sufficient to build up a higher ratio between the sulphur in the iron and the sulphur in the slag than would be obtained with the same slag under atmospheric pressure and under substantially equilibrium conditions.

5. The process of producing desulphurized pig iron, which comprises smelting iron ore in a coke blast furnace to make pig iron without regard to the content of sulphur in the resulting pig iron, transferring the pig iron from the blast furnace, treating the pig iron in molten condition with successive additions of a basic slag capable of removing sulphur from the pig iron, subsequent to transfer of the pig iron from the coke blast furnace, while protecting the slag from oxidizing gases, removing each addition before the next is added, and subjecting the slag and pig iron to a pressure less than atmospheric pressure during the treatment to facilitate the desulphurizing reaction.

6. The process of producing desulphurized pig iron, which comprises smelting iron ore in a coke blast furnace under conditions of temperature and basicity of the slag suitable to produce pig iron at lower cost, but with a sulphur content in excess of 0.10%, transferring the pig iron from the blast furnace, and subsequently treating the molten pig iron under reducing conditions with a total of not more than 8% of its weight of basic slag capable of removing sulphur from the pig iron, while subjecting the slag and pig iron to a pressure less than atmospheric pressure, thereby lowering the sulphur content of the pig iron to less than 0.05% and building up a higher ratio between the sulphur in the slag and the sulphur in the pig iron than would be obtained with the same slag under atmospheric pressure and under substantially equilibrium conditions.

7. The process of desulphurizing pig iron, which comprises treating the molten pig iron outside of the blast furnace with a total of not more than 8% of its weight of basic desulphurizing slag under reducing conditions and under a pressure less than atmospheric pressure, thereby building up a higher ratio between the sulphur in the slag and the sulphur in the pig iron than would be obtained with the same slag under atmospheric pressure and under substantially equilibrium conditions.

8. The process of producing desulphurized pig iron, which comprises smelting iron ore in a coke blast furnace to make pig iron under conditions which produce a higher sulphur content than that ultimately desired, transferring the pig iron from the blast furnace, treating the molten pig iron under reducing conditions with basic slag capable of removing sulphur subsequent to transfer from the coke blast furnace while subjecting the slag and pig iron to a pressure less than atmospheric pressure and agitating the molten reactants during desulphurization to facilitate the desulphurizing reaction.

9. The process of desulphurizing pig iron, which comprises treating a charge of pig iron in molten condition with a basic slag which removes sulphur from the pig iron while subjecting the slag and pig iron to a pressure less than atmospheric pressure, separating the slag from the molten pig iron, treating the slag to lower its sulphur content while the slag is out of contact with molten pig iron.

10. The process of desulphurizing molten pig iron produced in a coke blast furnace, which comprises treating molten pig iron external to the coke blast furnace with a basic slag containing calcium oxide and calcium fluoride while subjecting the slag and pig iron to a pressure less than atmospheric pressure, separating the sulphur-bearing slag from the desulphurized pig iron, treating the sulphur-bearing slag to lower its sulphur content and reusing the slag for desulphurizing a further charge of pig iron.

11. The process of desulphurizing pig iron, which comprises treating a charge of pig iron in molten condition in a carbon lining with a basic slag which removes sulphur while subjecting the slag and pig iron to a pressure less than the prevailing atmospheric pressure, separating the slag from the molten pig iron, treating the slag to lower its sulphur content while the slag is out of contact with the molten pig iron and out of contact with the carbon lining and reusing the slag to desulphurize a further charge of pig iron.

12. The process of desulphurizing pig iron, which comprises successively subjecting it in molten condition to basic desulphurizing slags of progressively decreasing sulphur content under reduced pressure and regenerating each of the slags when its sulphur content attains a predetermined maximum after use a plurality of times.

13. The process of desulphurizing molten pig iron by slags, which comprises treating molten pig iron at a pressure below atmospheric pressure with a first basic slag which has previously been used since revivification to desulphurize other molten pig iron but which is still capable of removing sulphur, building up a higher ratio between the sulphur in the slag and the sulphur in the pig iron than would be obtained with the same slag under atmospheric pressure and under substantially equilibrium conditions, separating the first slag from the molten pig iron, revivifying the first slag by removing sulphur from it, treating the molten pig iron at a pressure below atmospheric pressure with a second basic slag which has not been previously used since revivification to desulphurize molten pig iron and which is capable of removing more sulphur, separating the second slag from the pig iron and using the second slag for an initial desulphurizing treatment of a further charge of pig iron.

14. The process of producing desulphurized pig iron, which comprises smelting iron ore in a coke blast furnace to make pig iron under conditions which produce a substantially higher sulphur content than that desired, transferring the pig iron from the coke blast furnace and, subsequent to transfer, treating the pig iron with a basic desulphurizing slag which is liquid at 1200° C. while maintaining a noncontaminating reducing gas at a pressure less than atmospheric in contact with the pig iron and slag to facilitate the desulphurizing reaction.

15. The process of producing desulphurized pig iron, which comprises smelting iron ore in a coke blast furnace to make pig iron under conditions which produce a substantially higher sulphur content than that desired, transferring the pig iron from the coke blast furnace and, subsequent to transfer, treating the pig iron with a basic desulphurizing slag while maintaining carbon monoxide at a pressure less than atmospheric in contact with the pig iron and slag to facilitate the desulphurizing reaction.

16. The process of desulphurizing pig iron, which comprises tapping pig iron from a blast furnace, tapping blast furnace slag from a blast furnace and subsequently treating the molten pig iron with the molten blast furnace slag while maintaining a pressure substantially below atmospheric pressure.

17. The process of desulphurizing pig iron, which comprises tapping pig iron from a blast furnace, tapping blast furnace slag from a blast furnace and subsequently treating the molten pig iron with the molten blast furnace slag in a gas-tight carbon-lined vessel whose interior is at a pressure substantially below atmospheric pressure, thereby building up a higher ratio between the sulphur in the slag and the sulphur in the pig iron than would be obtained with the same slag under atmospheric pressure and under substantially equilibrium conditions.

18. The process of producing desulphurized pig iron, which comprises treating molten pig iron under reducing conditions with a basic desulphurizing slag under a pressure below 380 millimeters of mercury, whereby a ratio of the percentage of sulphur in the slag to the percentage of sulphur in the pig iron in excess of 100:1 is attained.

19. The process of producing desulphurized pig iron, which comprises treating molten pig iron under reducing conditions with a basic desulphurizing slag under a pressure below 150 millimeters of mercury, whereby a ratio of the percentage of sulphur in the slag to the percentage of sulphur in the pig iron in excess of 200:1 is attained.

20. In the manufacture of steel, the process which comprises smelting iron ore in a coke blast furnace under conditions as to temperature characteristic of a charcoal blast furnace and with a blast furnace slag containing more silica than lime plus magnesia, thereby producing pig iron excessively high in sulphur, and desulphurizing the molten pig iron subsequent to removal from the coke blast furnace and prior to charging into the steel-making furnace by treatment with a basic desulphurizing slag under reducing conditions while subjecting the slag and pig iron to a pressure less than atmospheric pressure to facilitate the desulphurizing reaction.

21. The process of producing steel, which comprises smelting iron ore under conditions which produce pig iron having a substantially higher sulphur content than that ultimately desired, removing the sulphur from the pig iron in molten condition by a basic slag under a pressure less than atmospheric pressure in the presence of carbon in substantial excess of that which will dissolve in the iron and in the absence of oxidizing gases while it is still pig iron by a wholly independent operation subsequent to the complete production of the pig iron and refining the pig iron to make steel as a wholly independent operation from the desulphurization.

22. In the production of steel, the art which comprises smelting iron ore in a coke blast furnace to make pig iron under conditions which produce a substantially higher sulphur content than that desired, transferring the pig iron from the coke blast furnace, and, subsequent to transfer, treating the pig iron with a basic desulphurizing slag having a melting point below 1200° C. and containing at least 30% of lime, in the presence of carbon in substantial excess of that which will dissolve in the iron and subjecting the slag and pig iron to a pressure less than atmospheric pressure during the treatment.

23. The process of treating a bath of molten iron to free it from sulphur and to maintain the sulphur freedom, which comprises desulphurizing the bath by basic slag under vacuum conditions and subsequently replacing the vacuum by a gas, at about atmospheric pressure, free from oxygen, carbon dioxide, carbon monoxide, and water vapor, the protecting gas being maintained in place until the slag shall have been removed.

RUSSELL P. HEUER.

CERTIFICATE OF CORRECTION.

Patent No. 2,110,067. March 1, 1938.

RUSSELL P. HEUER.

It is hereby certified that error appears in the printed specification of the above numbered patent requiring correction as follows: Page 4, first column, line 26, in the numerator of Equation 9, for "3.9" read 8.2; and that the said Letters Patent should be read with this correction therein that the same may conform to the record of the case in the Patent Office.

Signed and sealed this 3d day of May, A. D. 1938.

(Seal)

Henry Van Arsdale,
Acting Commissioner of Patents.

iron from the coke blast furnace and, subsequent to transfer, treating the pig iron with a basic desulphurizing slag while maintaining carbon monoxide at a pressure less than atmospheric in contact with the pig iron and slag to facilitate the desulphurizing reaction.

16. The process of desulphurizing pig iron, which comprises tapping pig iron from a blast furnace, tapping blast furnace slag from a blast furnace and subsequently treating the molten pig iron with the molten blast furnace slag while maintaining a pressure substantially below atmospheric pressure.

17. The process of desulphurizing pig iron, which comprises tapping pig iron from a blast furnace, tapping blast furnace slag from a blast furnace and subsequently treating the molten pig iron with the molten blast furnace slag in a gas-tight carbon-lined vessel whose interior is at a pressure substantially below atmospheric pressure, thereby building up a higher ratio between the sulphur in the slag and the sulphur in the pig iron than would be obtained with the same slag under atmospheric pressure and under substantially equilibrium conditions.

18. The process of producing desulphurized pig iron, which comprises treating molten pig iron under reducing conditions with a basic desulphurizing slag under a pressure below 380 millimeters of mercury, whereby a ratio of the percentage of sulphur in the slag to the percentage of sulphur in the pig iron in excess of 100:1 is attained.

19. The process of producing desulphurized pig iron, which comprises treating molten pig iron under reducing conditions with a basic desulphurizing slag under a pressure below 150 millimeters of mercury, whereby a ratio of the percentage of sulphur in the slag to the percentage of sulphur in the pig iron in excess of 200:1 is attained.

20. In the manufacture of steel, the process which comprises smelting iron ore in a coke blast furnace under conditions as to temperature characteristic of a charcoal blast furnace and with a blast furnace slag containing more silica than lime plus magnesia, thereby producing pig iron excessively high in sulphur, and desulphurizing the molten pig iron subsequent to removal from the coke blast furnace and prior to charging into the steel-making furnace by treatment with a basic desulphurizing slag under reducing conditions while subjecting the slag and pig iron to a pressure less than atmospheric pressure to facilitate the desulphurizing reaction.

21. The process of producing steel, which comprises smelting iron ore under conditions which produce pig iron having a substantially higher sulphur content than that ultimately desired, removing the sulphur from the pig iron in molten condition by a basic slag under a pressure less than atmospheric pressure in the presence of carbon in substantial excess of that which will dissolve in the iron and in the absence of oxidizing gases while it is still pig iron by a wholly independent operation subsequent to the complete production of the pig iron and refining the pig iron to make steel as a wholly independent operation from the desulphurization.

22. In the production of steel, the art which comprises smelting iron ore in a coke blast furnace to make pig iron under conditions which produce a substantially higher sulphur content than that desired, transferring the pig iron from the coke blast furnace, and, subsequent to transfer, treating the pig iron with a basic desulphurizing slag having a melting point below 1200° C. and containing at least 30% of lime, in the presence of carbon in substantial excess of that which will dissolve in the iron and subjecting the slag and pig iron to a pressure less than atmospheric pressure during the treatment.

23. The process of treating a bath of molten iron to free it from sulphur and to maintain the sulphur freedom, which comprises desulphurizing the bath by basic slag under vacuum conditions and subsequently replacing the vacuum by a gas, at about atmospheric pressure, free from oxygen, carbon dioxide, carbon monoxide, and water vapor, the protecting gas being maintained in place until the slag shall have been removed.

RUSSELL P. HEUER.

CERTIFICATE OF CORRECTION.

Patent No. 2,110,067. March 1, 1938.

RUSSELL P. HEUER.

It is hereby certified that error appears in the printed specification of the above numbered patent requiring correction as follows: Page 4, first column, line 26, in the numerator of Equation 9, for "3.9" read 8.2; and that the said Letters Patent should be read with this correction therein that the same may conform to the record of the case in the Patent Office.

Signed and sealed this 3d day of May, A. D. 1938.

(Seal)

Henry Van Arsdale,
Acting Commissioner of Patents.

CERTIFICATE OF CORRECTION.

Patent No. 2,110,067. March 1, 1938.

RUSSELL P. HEUER.

It is hereby certified that error appears in the printed specification of the above numbered patent requiring correction as follows: Page 4, first column, line 26, in the numerator of Equation 9, for "3.9" read 8.2; and that the said Letters Patent should be read with this correction therein that the same may conform to the record of the case in the Patent Office.

Signed and sealed this 3d day of May, A. D. 1938.

(Seal)

Henry Van Arsdale,
Acting Commissioner of Patents.